US012172531B2

(12) United States Patent
Watanabe (10) Patent No.: US 12,172,531 B2
(45) Date of Patent: Dec. 24, 2024

(54) MOTOR DRIVING APPARATUS (71) Applicant: HONDA MOTOR CO., LTD., Tokyo (JP)

(72) Inventor: Yusaku Watanabe, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 146 days.

(21) Appl. No.: 17/983,712

(22) Filed: Nov. 9, 2022

(65) Prior Publication Data
US 2023/0150375 A1 May 18, 2023

(30) Foreign Application Priority Data
Nov. 16, 2021 (JP) ................. 2021-186632

(51) Int. Cl.
| | |
|---|---|
| H02P 27/08 | (2006.01) |
| B60L 50/51 | (2019.01) |
| B60L 53/14 | (2019.01) |
| H02M 1/10 | (2006.01) |
| H02M 7/797 | (2006.01) |
| H02P 5/74 | (2006.01) |
| H02P 25/22 | (2006.01) |
| H02P 27/06 | (2006.01) |

(52) U.S. Cl.
CPC ............. *B60L 50/51* (2019.02); *B60L 53/14* (2019.02); *H02P 5/74* (2013.01); *H02P 27/06* (2013.01); *B60L 2210/40* (2013.01); *B60L 2220/54* (2013.01)

(58) Field of Classification Search
CPC .......... B60L 50/51; B60L 53/11; B60L 53/24; B60L 53/14; B60L 2220/54; B60L 2210/40; H02M 7/797; H02M 1/10; H02P 5/74; H02P 27/08; H02P 27/06; H02P 25/22; H02P 2201/07; Y02T 90/14; Y02T 10/70
USPC ........................................................ 318/139
See application file for complete search history.

(56) References Cited

U.S. PATENT DOCUMENTS

| | | | |
|---|---|---|---|
| 2007/0120520 A1* | 5/2007 | Miyazaki | ............. B60L 15/025 318/801 |
| 2014/0368131 A1 | 12/2014 | Katsumata et al. | |
| 2015/0048767 A1* | 2/2015 | Takezawa | ................. H02P 6/14 327/109 |

(Continued)

FOREIGN PATENT DOCUMENTS

WO WO 2013/168491 A1 11/2013

*Primary Examiner* — Gabriel Agared
(74) *Attorney, Agent, or Firm* — Paratus Law Group, PLLC (57) ABSTRACT

A motor driving apparatus includes: a power storage device; a motor; a first inverter; a second inverter; an external AC terminal; a third inverter including a DC terminal and an AC terminal; a transformer connected to the AC terminal of the third inverter; a first switch capable of switching the AC terminal of the first inverter to a state of being connected to either the first winding connection portion or the external AC terminal; a second switch capable of switching the AC terminal of the second inverter to a state of being connected to either the second winding connection portion or the transformer; and a third switch capable of switching the power storage device to a state of being connected to either the DC terminal of the first inverter and the DC terminal of the second inverter or the DC terminal of the third inverter.

9 Claims, 10 Drawing Sheets

(56) References Cited

U.S. PATENT DOCUMENTS

2016/0144729 A1* 5/2016 Huang .................... B60L 50/51
                                                                        307/10.1
2019/0255960 A1* 8/2019 Tons ................... H02M 7/5387

* cited by examiner

MOTOR DRIVING APPARATUS

CROSS-REFERENCE TO RELATED APPLICATIONS

This application is based on and claims priority under 35 USC 119 from Japanese Patent Application No. 2021-186632 filed on Nov. 16, 2021.

TECHNICAL FIELD

The present disclosure relates to a motor driving apparatus.

BACKGROUND ART

In recent years, as a concrete countermeasure against global climate change, efforts toward realization of a low-carbon society or a decarbonization society are activated. Also, in vehicles, a reduction in $CO_2$, emission is strongly required, and a driving source is rapidly electrified. Specifically, a vehicle such as an electrical vehicle or a hybrid electrical vehicle, is which includes an electric motor as a driving source of the vehicle, a battery as a secondary battery capable of supplying power to the electric motor, and an inverter as a power conversion device, are now under development.

In such a vehicle, it is required to reduce the size and % eight of the entire system and to improve the energy efficiency.

For example, WO-A1-2013-168491 describes a vehicle motor driving apparatus using an inverter for driving a motor for external charging.

However, the motor driving apparatus described in WO-A1-2013-168491 has many electronic components which are present only for charging, and there is room for improvement.

SUMMARY

The present disclosure provides a motor driving apparatus capable of reducing the number of components while sharing a driving circuit and a charging circuit.

Aspect of the present disclosure relates to a motor driving apparatus, including:
- a power storage device;
- a motor including at least a first winding connection portion and a second winding connection portion;
- a first inverter including a DC terminal and an AC terminal and configured to supply power from the power storage device to the first winding connection portion;
- a second inverter including a DC terminal and an AC terminal and configured to supply power from the power storage device to the second winding connection portion;
- an external AC terminal capable of transmitting power between the power storage device and an external AC power supply;
- a third inverter including a DC terminal and an AC terminal;
- a transformer connected to the AC terminal of the third inverter;
- a first switch capable of switching the AC terminal of the first inverter to a state of being connected to either the first winding connection portion or the external AC terminal;
- a second switch capable of switching the AC terminal of the second inverter to a state of being connected to either the second winding connection portion or the transformer; and
- a third switch capable of switching the power storage device to a state of being connected to either the DC terminal of the first inverter and the DC terminal of the second inverter or the DC terminal of the third inverter.

According to the present disclosure, since the driving circuit and the charging circuit can be shared, the number of electronic components used only for charging and the number of electronic components used only for driving are reduced, and the number of components can be reduced.

DESCRIPTION OF EMBODIMENTS

Hereinafter, embodiments of a motor driving apparatus of the present disclosure will be described with reference to the accompanying drawings.

Figure 1:
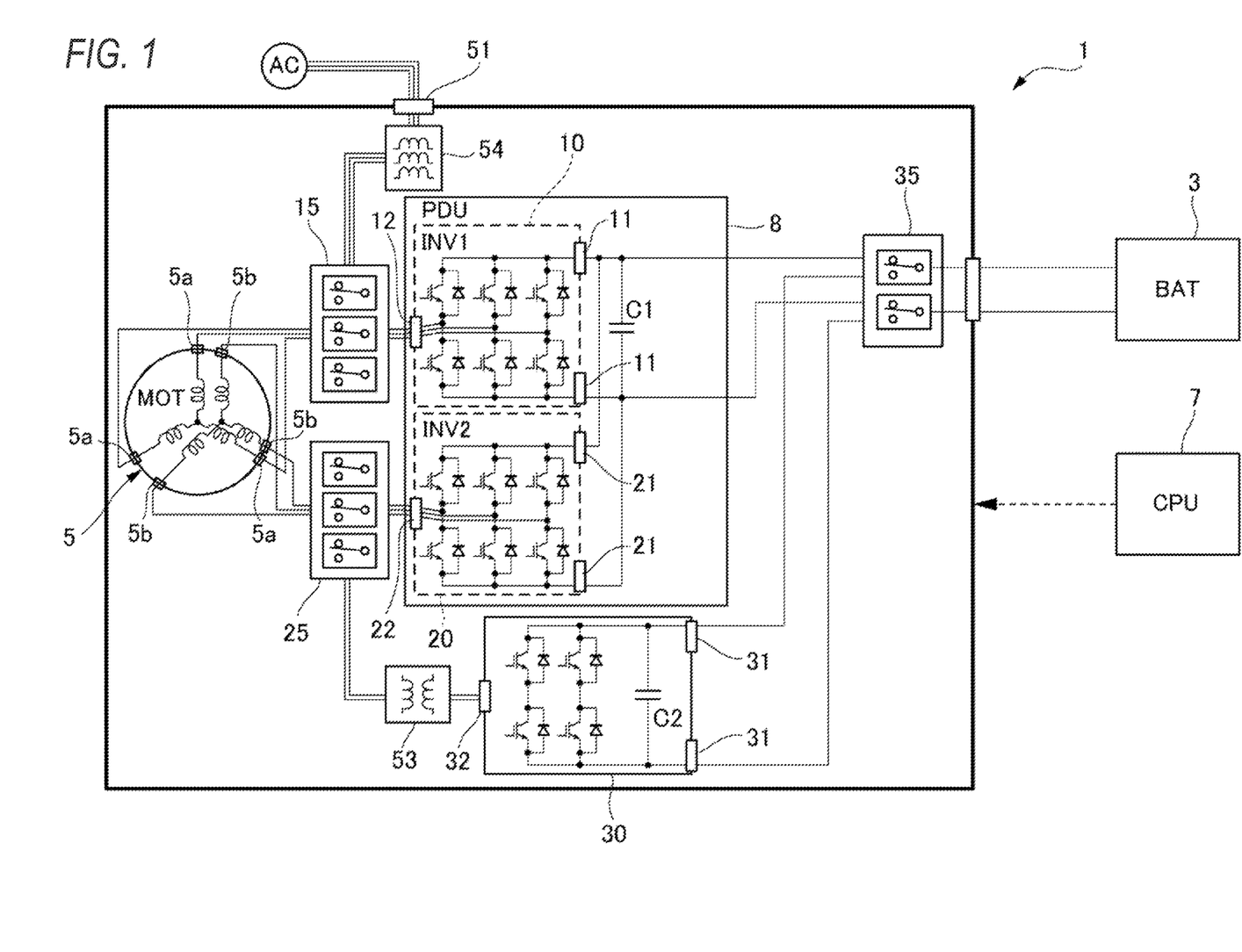
FIG. 1 is a circuit diagram of a motor driving apparatus 1 of a first embodiment.

FIG. 1 is a circuit diagram of a motor driving apparatus 1 of a first embodiment of the present disclosure. The motor driving apparatus 1 includes a power storage device 3 (BAT), a motor 5, a first inverter 10 (INV1), a second inverter 20 (INV2), and an external AC terminal 51. The motor driving apparatus 1 further includes a third inverter 30, a transformer 53, an inductor 54, a first switch 15, a second switch 25, and a third switch 35. The motor driving apparatus 1 converts, for example, a direct current from the power storage device 3 mounted on a vehicle into an alternating current, and drives the motor 5 which is a driving source. The motor driving apparatus 1 stores power in the power storage device 3 by power transmission from an external AC power supply AC connected to the external AC terminal 51. The power storage device 3 is a battery and a secondary battery such as a lithium-ion secondary battery or a nickel-hydrogen battery can be used, and a type thereof is not particularly limited.

Figure 9:
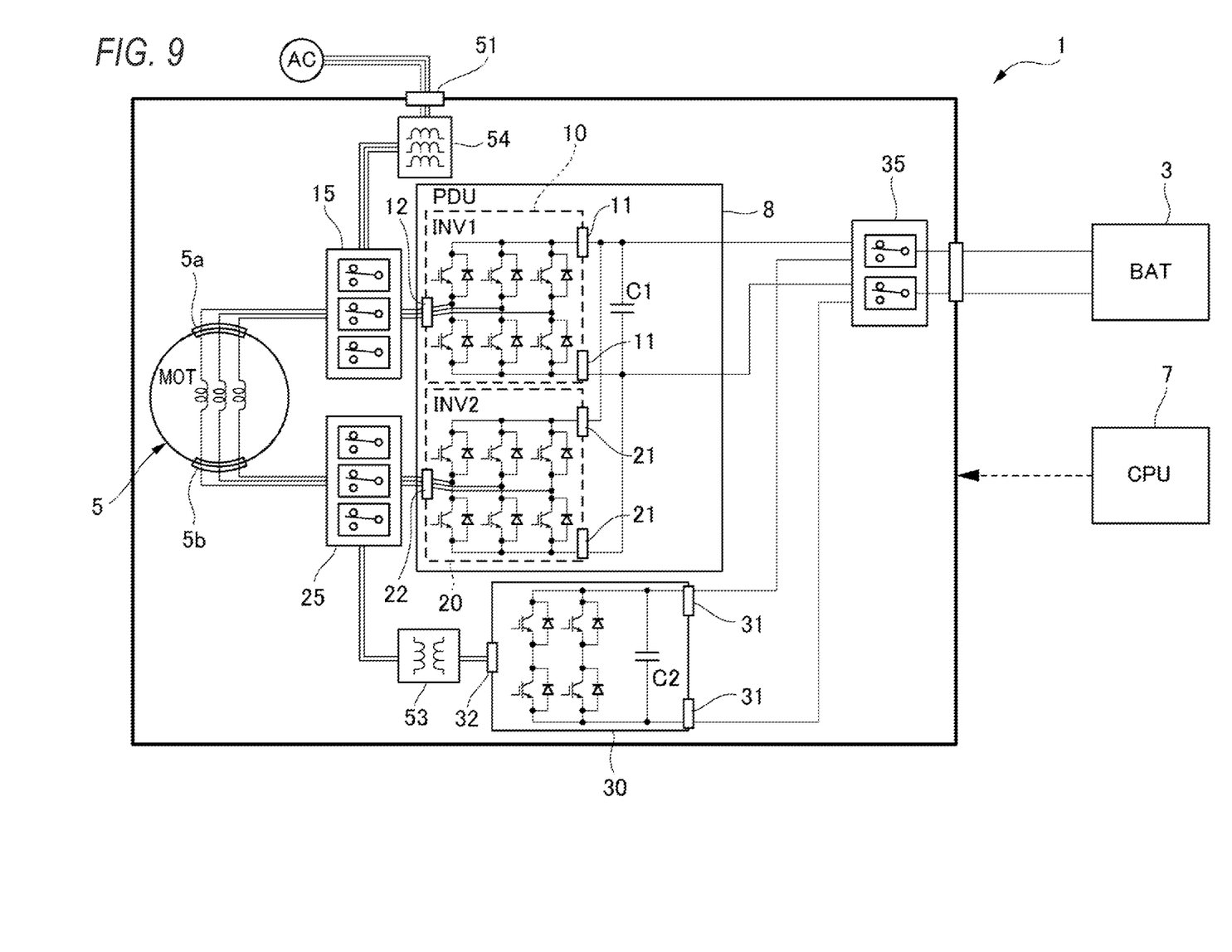
FIG. 9 is a circuit diagram of the motor driving apparatus 1 of a first modification.
Figure 10:
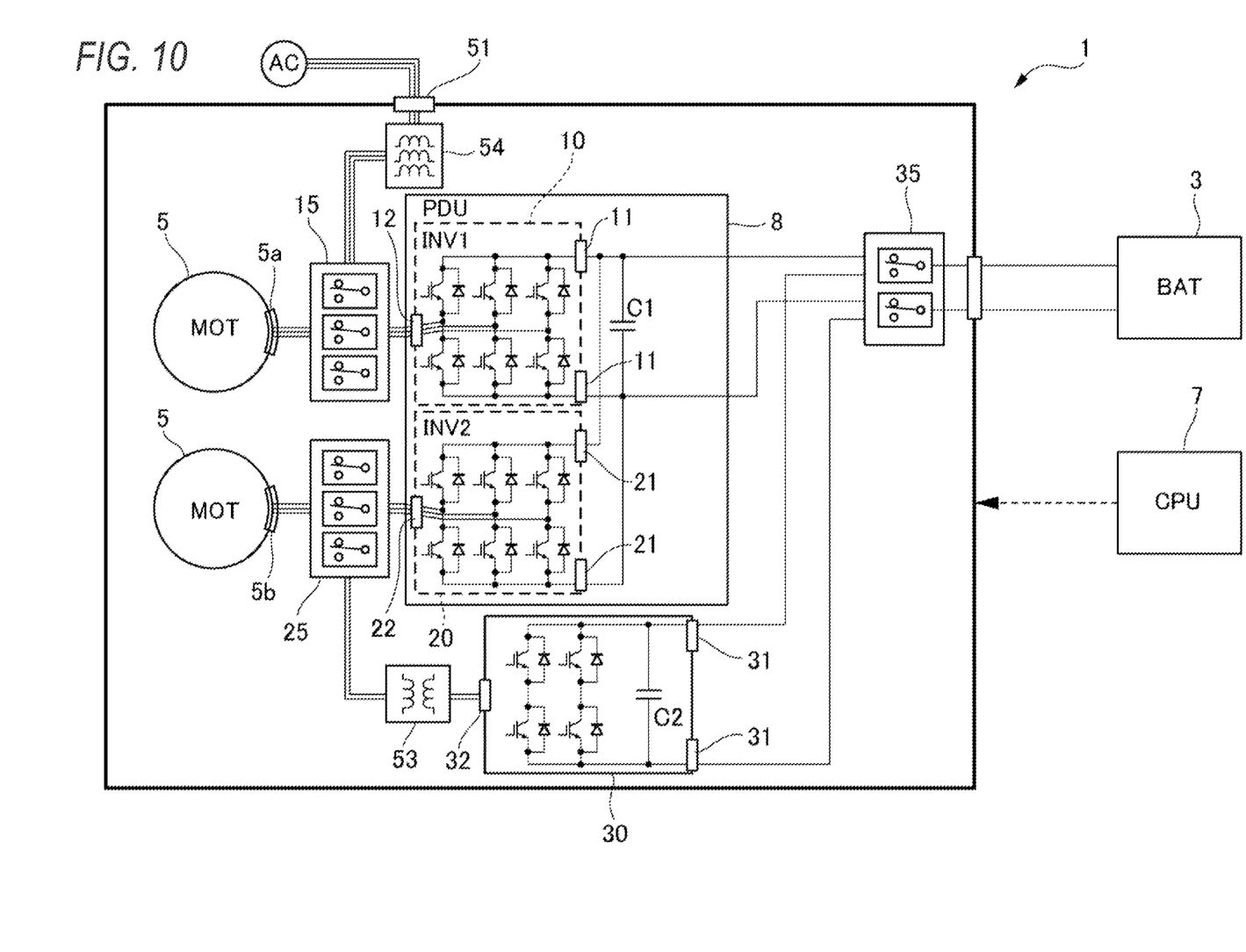
FIG. 10 is a circuit diagram of the motor driving apparatus 1 of a second modification.

The motor 5 is a dual three-phase motor including two sets of three-phase winding connection portions. The winding connection portions of each phase include a first winding connection portion 5a connected to a first winding and a second winding connection portion 5b connected to a second winding. The winding connection portion is, for example, a terminal unit including one set of U-phase, V-phase, and W-phase terminals connected to a three-phase winding. Although not shown, the motor 5 includes a rotating rotor and a stator disposed on an outer periphery of the rotor. The stator has multiple teeth arranged at regular intervals, and three-phase coils connected to the first winding connection portions 5a and three-phase coils connected to the second winding connection portions Sb are wound around the teeth. However, a type of the motor 5 is not particularly limited, and the motor 5 may be a motor including three or more sets of winding connection portions. For example, as shown in a first modification of FIG. 9, the motor 5 may be an open-winding type motor including two sets of three-phase winding connection portions. Further, the number of the motors 5 may be one, or may be two as in a second modification shown in FIG. 10. When the motor driving apparatus 1 includes two motors 5, it is preferable that each of the motors includes one set of three-phase winding connection portions.

Returning to FIG. 1, the first inverter 10 includes DC terminals 11, an AC terminal 12, and three-phase arms connected in parallel, and is configured to be able to supply power from the power storage device 3 to the first winding connection portion 5a. Each of the arms includes a pair of switching elements connected in series, for example, insulated gate bipolar transistors (IGBT), and a freewheeling diode is connected in parallel to each of the switching elements. The DC terminals 11 of the first inverter 10 are connected to a positive conductive wire and a negative conductive wire of the three-phase arms connected in parallel, and are connected to the power storage device 3 via a capacitor C1 and the third switch 35 to be described later. The AC terminal 12 of the first inverter 10 is connected to a connection point between the pair of switching elements of each of the arms, and is connected to the first winding connection portion 5a of the motor 5 via the first switch 15 to be described later. As a result, the first inverter 10 can convert power of the power storage device 3, which is a DC power supply, into AC power and supply the AC power to the first winding connection portion 5a of the motor 5, which is an AC motor.

The second inverter 20 includes DC terminals 21, an AC terminal 22, and three-phase arms connected in parallel, and is configured to be able to supply power from the power storage device 3 to the second winding connection portion 5b. Each of the arms includes a pair of switching elements connected in series, for example, IGBTs, and a freewheeling diode is connected in parallel to each of the switching elements. The DC terminals 21 of the second inverter 20 are connected to a positive conductive wire and a negative conductive wire of the three-phase arms connected in parallel, and are connected to the power storage device 3 via the capacitor C1 and the third switch 35 to be described later. The AC terminal 22 of the second inverter 20 is connected to a connection point between the pair of switching elements of each of the arms, and is connected to the second winding connection portion 5b of the motor 5 via the second switch 25 to be described later. As a result, the second inverter 20 can convert the power of the power storage device 3, which is a DC power supply, into AC power and supply the AC power to the second winding connection portion 5b of the motor 5, which is an AC motor.

The first inverter 10 and the second inverter 20 constitute a power conversion unit 8 (PDU).

The external AC terminal 51 is a terminal which enables power transmission between the power storage device 3 and the external AC power supply AC. When the motor driving apparatus 1 is connected to an external AC power supply AC such as a household power supply or other equipment power supply. AC power is supplied from the external AC terminal 51 to the motor driving apparatus 1, and the power storage device 3, which is a DC power supply, can store the power. This process will be described later.

The third inverter 30 includes DC terminals 31, an AC terminal 32, and two-phase arms connected in parallel. Each of the arms includes a pair of switching elements connected in series, for example, IGBTs, and a freewheeling diode is connected in parallel to each of the switching elements. The DC terminals 31 of the third inverter 30 are connected to a positive conductive wire and a negative conductive wire of each of the arms, and are connected to the power storage device 3 via a capacitor C2 and the third switch 35 to be described later. The AC terminal 32 of the third inverter 30 is connected to a connection point between the pair of switching elements of each of the arms, and is also connected to the transformer 53. The third inverter 30 and the transformer 53 may have three phases in combination with the number of phases of the second inverter 20 and the motor 5.

The first switch 15 is connected to the AC terminal 12 of the first inverter 10, and is selectively connected to the first winding connection portion 5a of the motor 5 or the external AC terminal 51. That is, the first switch 15 is a switch capable of switching the AC terminal 12 of the first inverter 10 to a state of being connected to either the first winding connection portion 5a or the external AC terminal 51.

The second switch 25 is connected to the AC terminal 22 of the second inverter 20, and is selectively connected to the second winding connection portion 5b of the motor 5 or the transformer 53. That is, the second switch 25 is a switch capable of switching the AC terminal 22 of the second inverter 20 is connected to either the second winding connection portion 5b or the transformer 53.

The third switch 35 is connected to the power storage device 3, and is selectively connected to the DC terminal 11 of the first inverter 10 and the DC terminal 21 of the second inverter 20, or the DC terminal 31 of the third inverter 30. That is, the third switch 35 is a switch capable of switching the power storage device 3 to a state of being connected to the DC terminal 11 of the first inverter 10 and the DC terminal 21 of the second inverter 20 or to the DC terminal 31 of the third inverter 30.

The motor driving apparatus 1 includes a control device 7 (CPU) in addition to the above configurations. The control device 7 controls an operation of the motor driving apparatus 1, in particular, the switching of the first switch 15, the second switch 25, and the third switch 35, and the switching of the first inverter 10, the second inverter 20, and the third inverter 30, depending on the situation. The control device 7 may include various processors (computers) or the like which operate in accordance with a predetermined program.

The control device 7 can control the motor driving apparatus 1 in two types of modes, that is, 1) a driving mode in which the motor 5 is driven, such as when a vehicle moves, and 2) an external AC charging mode in which power is transmitted between the power storage device 3 and the external AC power supply AC, such as when the vehicle is charged. Hereinafter, the modes will be described with reference to FIGS. 2 and 3.

Figure 2:
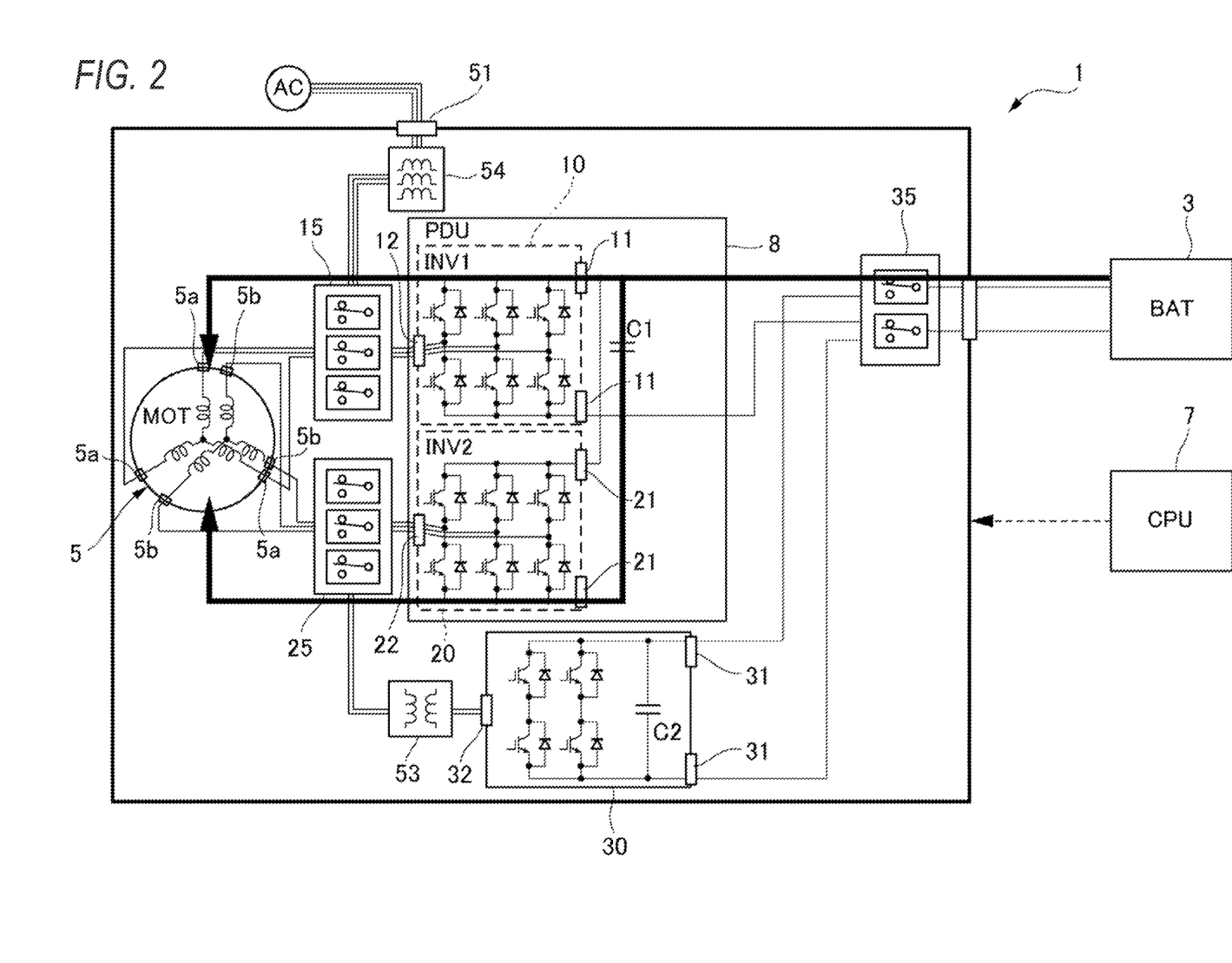
FIG. 2 is a diagram showing the current flow when a motor is driven in the circuit diagram of the motor driving apparatus 1 of the first embodiment.

FIG. 2 is a diagram showing the current flow in the driving mode with solid arrows. When the motor 5 is driven, the control device 7 controls the first switch 15, the second switch 25, and the third switch 35 as follows.

That is, the control device 7 controls the first switch 15 such that the AC terminal 12 of the first inverter 10 is connected to the first winding connection portion 5a. The control device 7 controls the second switch 25 such that the AC terminal 22 of the second inverter 20 is connected to the second winding connection portion 5b. Further, the control device 7 controls the third switch 35 such that the power storage device 3 is connected to the DC terminal 11 of the first inverter 10 and the DC terminal 21 of the second inverter 20.

By this control, a transmission path through which power can be transmitted is set as a path from the power storage device 3 to the motor 5 via the first inverter 10 and the second inverter 20. As a result, the control device 7 can set a driving mode in which power is transmitted along the solid arrows in FIG. 2 and the motor 5 is driven using the first inverter 10 and the second inverter 20.

Figure 3:
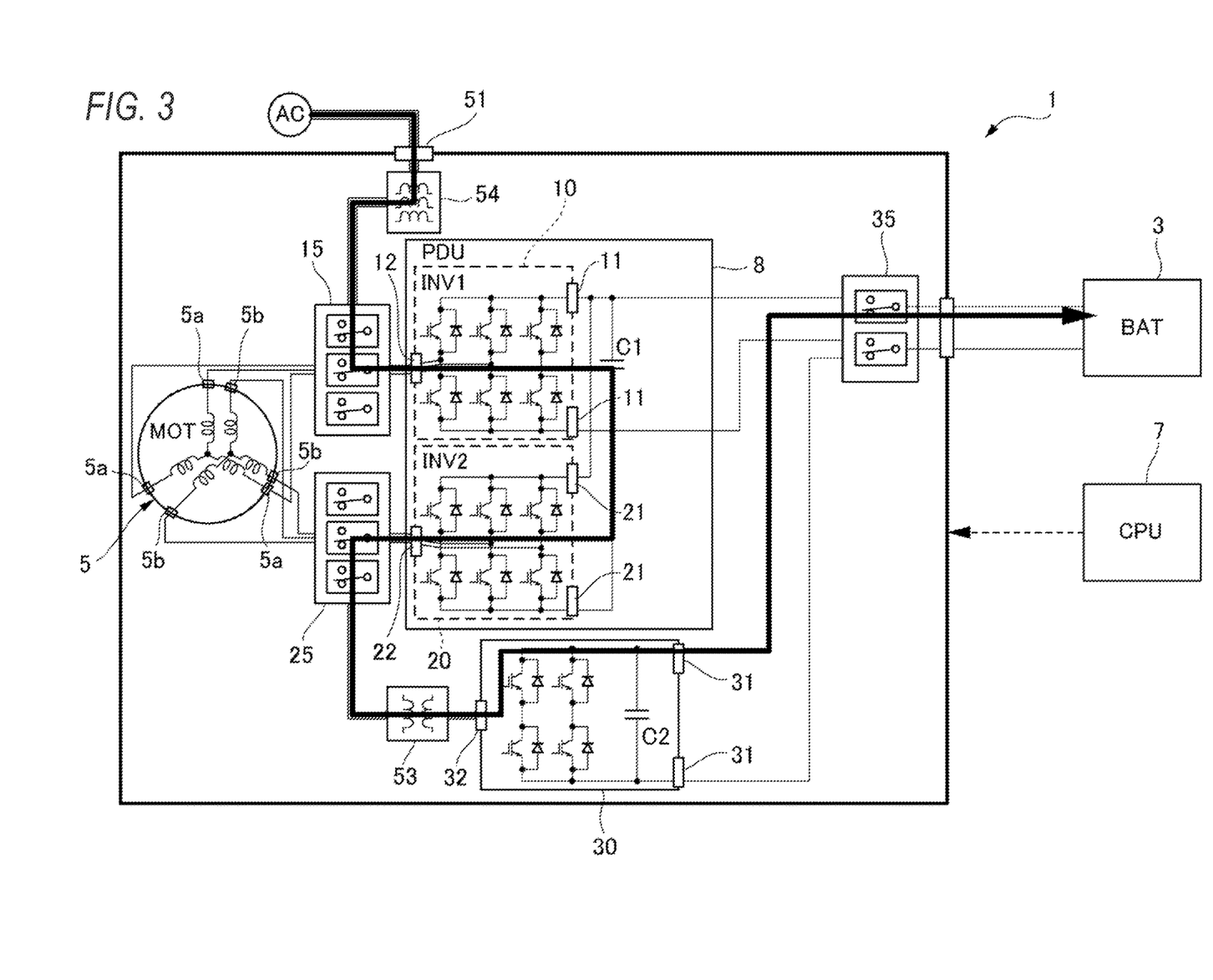
FIG. 3 is a diagram showing the current flow when an external AC power supply is connected in the circuit diagram of the motor driving apparatus 1 of the first embodiment.

FIG. 3 is a diagram showing the current flow in the external AC charging mode with a solid arrow. When the external AC power supply AC is connected to the external AC terminal 51, the control device 7 controls the first switch 15, the second switch 25, and the third switch 35 as follows.

That is, the control device 7 controls the first switch 15 such that the AC terminal 12 of the first inverter 10 is connected to the external AC terminal 51. The control device 7 controls the second switch 25 such that the AC terminal 22 of the second inverter 20 is connected to the transformer 53. Further, the control device 7 controls the third switch 35 such that the power storage device 3 is connected to the DC terminal 31 of the third inverter 30.

By this control, a transmission path through which power can be transmitted is set to a path between the external AC power supply AC and the power storage device 3 via the first inverter 10, the second inverter 20, and the third inverter 30. As a result, the control device 7 can set an external AC charging mode in which power is transmitted along the solid arrow in FIG. 3, and power is transmitted between the power storage device 3 and the external AC power supply AC using the first inverter 10, the second inverter 20, and the third inverter 30. This power transmission is possible in two directions, that is, a direction from the power storage device 3 to the external AC power supply AC and a direction from the external AC power supply AC to the power storage device 3, and is bidirectional charging.

According to the motor driving apparatus 1 of the present embodiment, the motor 5 can be driven using the first inverter 10 and the second inverter 20 when driving the motor 5, and the power storage device 3 can be charged using the first inverter 10, the second inverter 20, and the third inverter 30 when the external AC power supply AC is connected.

That is, in the driving mode and the external AC charging mode, the first inverter 10 and the second inverter 20 are shared. Therefore, since the motor driving apparatus 1 can share a driving circuit and a charging circuit, the number of electronic components used only for charging and the number of electronic components used only for driving are reduced, and the number of components can be reduced.

Since both the first inverter 10 and the second inverter 20 are used during driving, a capacity can be halved as compared with the case of using one inverter. The first inverter 10 and the second inverter 20 can perform a plurality of functions (part of rectification and DC-DC conversion) of an insulated AC charger, and can optimize a driving circuit capacity for charging.

Figure 4:
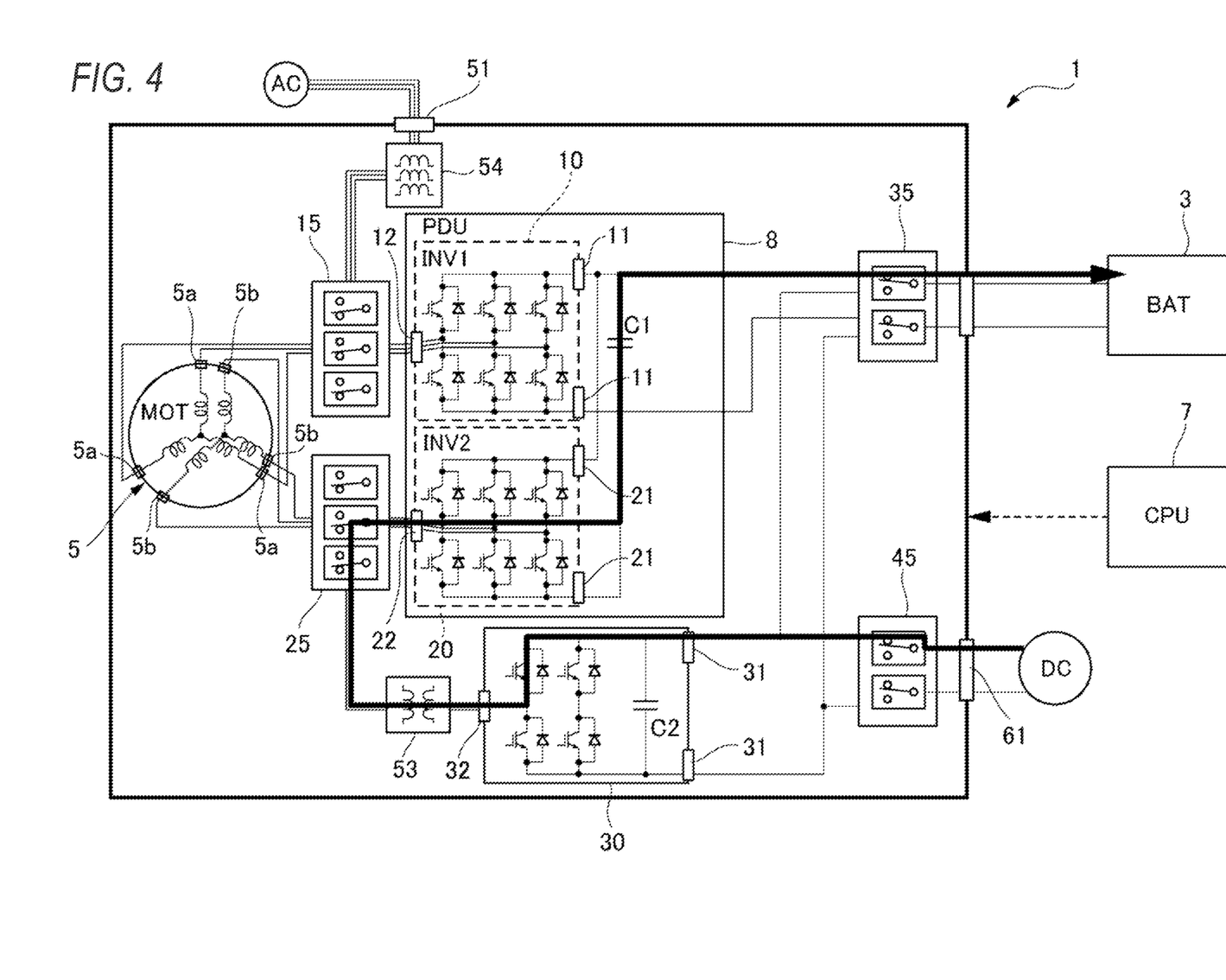
FIG. 4 is a circuit diagram of the motor driving apparatus 1 of a second embodiment and a diagram showing the current flow when an external DC power supply is connected in the circuit diagram.

FIG. 4 is a circuit diagram of the motor driving apparatus 1 of a second embodiment and a diagram showing the current flow when an external DC power supply DC is connected in the circuit diagram. The motor driving apparatus 1 of the present embodiment can be charged not only by the external AC power supply AC but also by the external DC power supply DC.

The motor driving apparatus 1 of the present embodiment further includes an external DC terminal 61 connected between the DC terminal 31 of the third inverter 30 and the third switch 35 via a fourth switch 45. The fourth switch 45 can switch between an ON state in which the external DC terminal 61 is connected to the DC terminal 31 of the third inverter 30 and the third switch 35, and an OFF state in which the external DC terminal 61 is disconnected from the DC terminal 31 of the third inverter 30 and the third switch 35. In the present embodiment, the control device 7 can also control the fourth switch 45. When the external DC power supply DC is connected to the external DC terminal 61, the control device 7 turns on the fourth switch 45 and controls the second switch 25 and the third switch 35 as follows.

That is, the control device 7 controls the second switch 25 such that the AC terminal 22 of the second inverter 20 is connected to the transformer 53. Further, the control device 7 controls the third switch 35 such that the power storage device 3 is connected to the DC terminal 11 of the first inverter 10 and the DC terminal 21 of the second inverter 20. The control device 7 turns off all the switching elements of the first inverter 10.

By this control, a transmission path through which power can be transmitted is set to a path between the external DC power supply DC and the power storage device 3 via the second inverter 20 and the third inverter 30, As a result, the control device 7 can set a first external DC charging mode in which power is transmitted along a solid arrow in FIG. 4, and power is transmitted between the power storage device 3 and the external DC power supply DC using the second inverter 20, the transformer 53, and the third inverter 30. This power transmission is possible in two directions, that is, a direction from the power storage device 3 to the external DC power supply DC and a direction from the external DC power supply DC to the power storage device 3, and is bidirectional charging.

According to the motor driving apparatus 1 of the present embodiment, when the external DC power supply DC is connected, the power storage device 3 can be charged using the second inverter 20, the transformer 53, and the third inverter 30. The external DC power supply DC is, for example, a portable battery.

Figure 5:
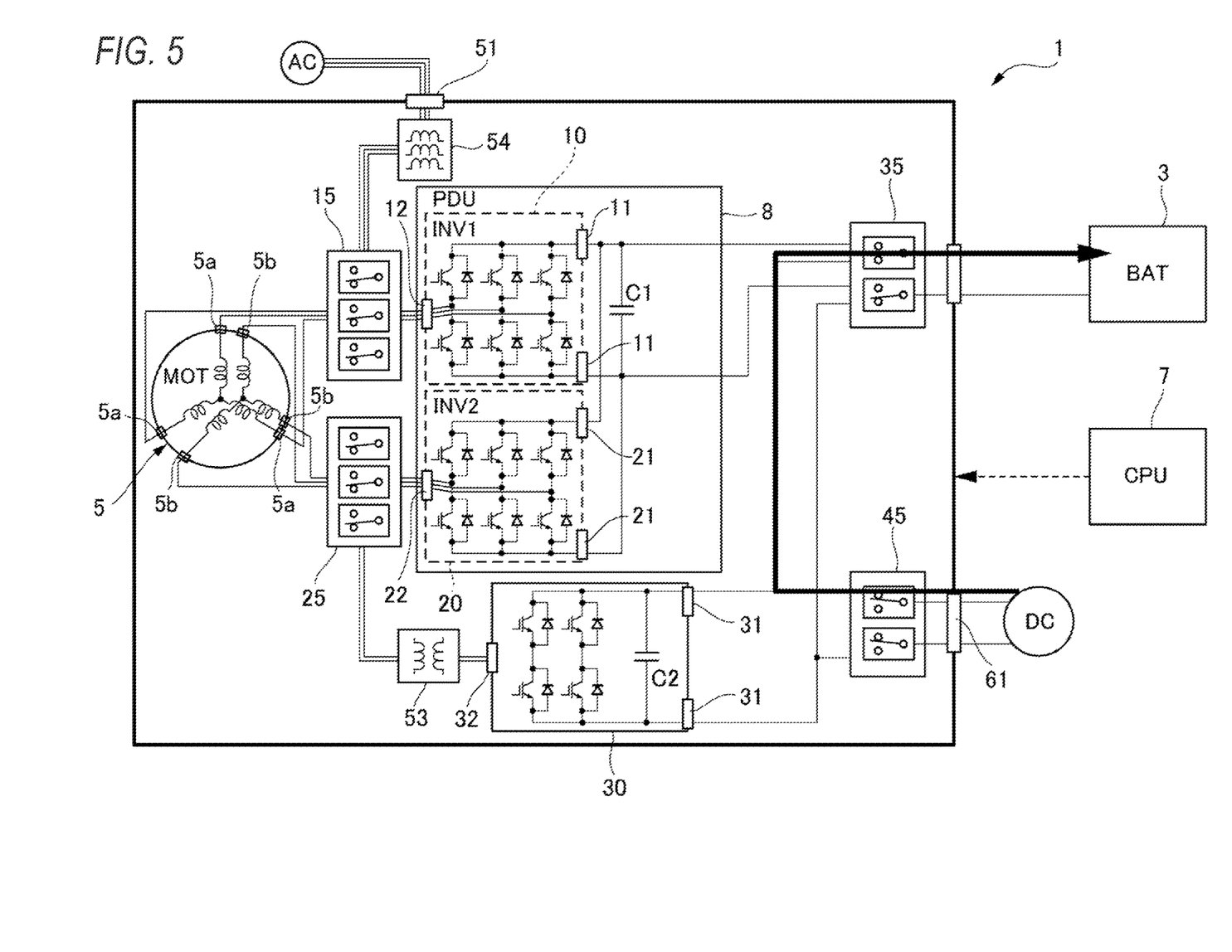
FIG. 5 is a circuit diagram of the motor driving apparatus 1 of a third embodiment and a diagram showing the current flow when an external DC power supply is connected in the circuit diagram.

FIG. 5 is a circuit diagram of the motor driving apparatus 1 of a third embodiment and a diagram showing the current flow when the external DC power supply DC is connected in the circuit diagram. The basic configuration of the present embodiment is the same as that of the second embodiment. However, unlike the second embodiment, when the external DC power supply DC is connected to the external DC terminal 61, the control device 7 turns on the fourth switch 45 and controls the third switch 35 as follows.

That is, the control device 7 controls the third switch 35 such that the power storage device 3 is connected to the DC terminal 31 of the third inverter 30. Further, the control device 7 turns off all the switching elements of the third inverter 30, and transmits power to the power storage device 3 without using the third inverter 30.

By this control, a transmission path through which power can be transmitted is set to a path between the external DC power supply DC and the power storage device 3 without passing through the third inverter 30. As a result, the control device 7 can set a second external DC charging mode in which power is transmitted along a solid arrow in FIG. 5 and power is transmitted between the power storage device 3 and the external DC power supply DC without using the third inverter 30. This power transmission is possible in two directions, that is, the direction from the power storage device 3 to the external DC power supply DC and the direction from the external DC power supply DC to the power storage device 3, and is bidirectional charging.

According to the motor driving apparatus 1 of the present embodiment, when the external DC power supply DC is connected, the power storage device 3 can be charged without using the third inverter 30. The external DC power supply DC is, for example, a quick charger.

Figure 6:
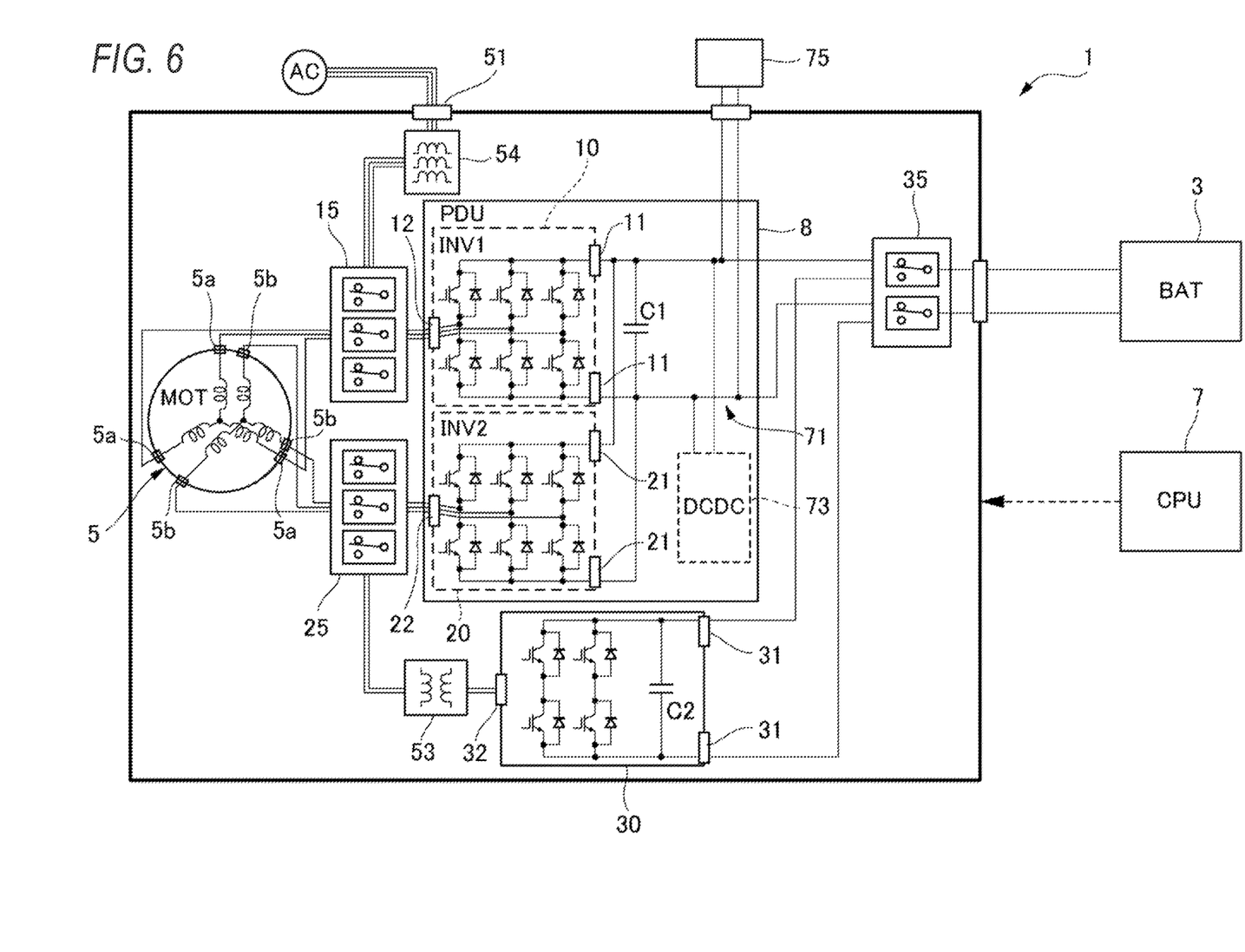
FIG. 6 is a circuit diagram of the motor driving apparatus 1 of a fourth embodiment.

FIG. 6 is a circuit diagram of the motor driving apparatus 1 of a fourth embodiment. In addition to the configurations of the above embodiments, the motor driving apparatus 1 of the present embodiment further includes an accessory connection circuit 71 which is connected between the first inverter 10 and the third switch 35 and between the second inverter 20 and the third switch 35 to transmit power to an accessory. The accessory includes, for example, a DC-DC converter 73 and an electric oil pump 75. The DC-DC converter 73 preferably constitutes the power conversion unit 8 together with the first inverter 10 and the second inverter 20.

In the present embodiment, the control device 7 can also control the accessory connection circuit 71. The control device 7 stops an operation of the accessory connection circuit 71 when switching between a driving mode and an external AC charging mode.

By this control, it is possible to suppress an arc generated in the third switch 35 when switching between the driving mode and the external AC charging mode, thereby extending the life of the third switch 35.

Figure 7:
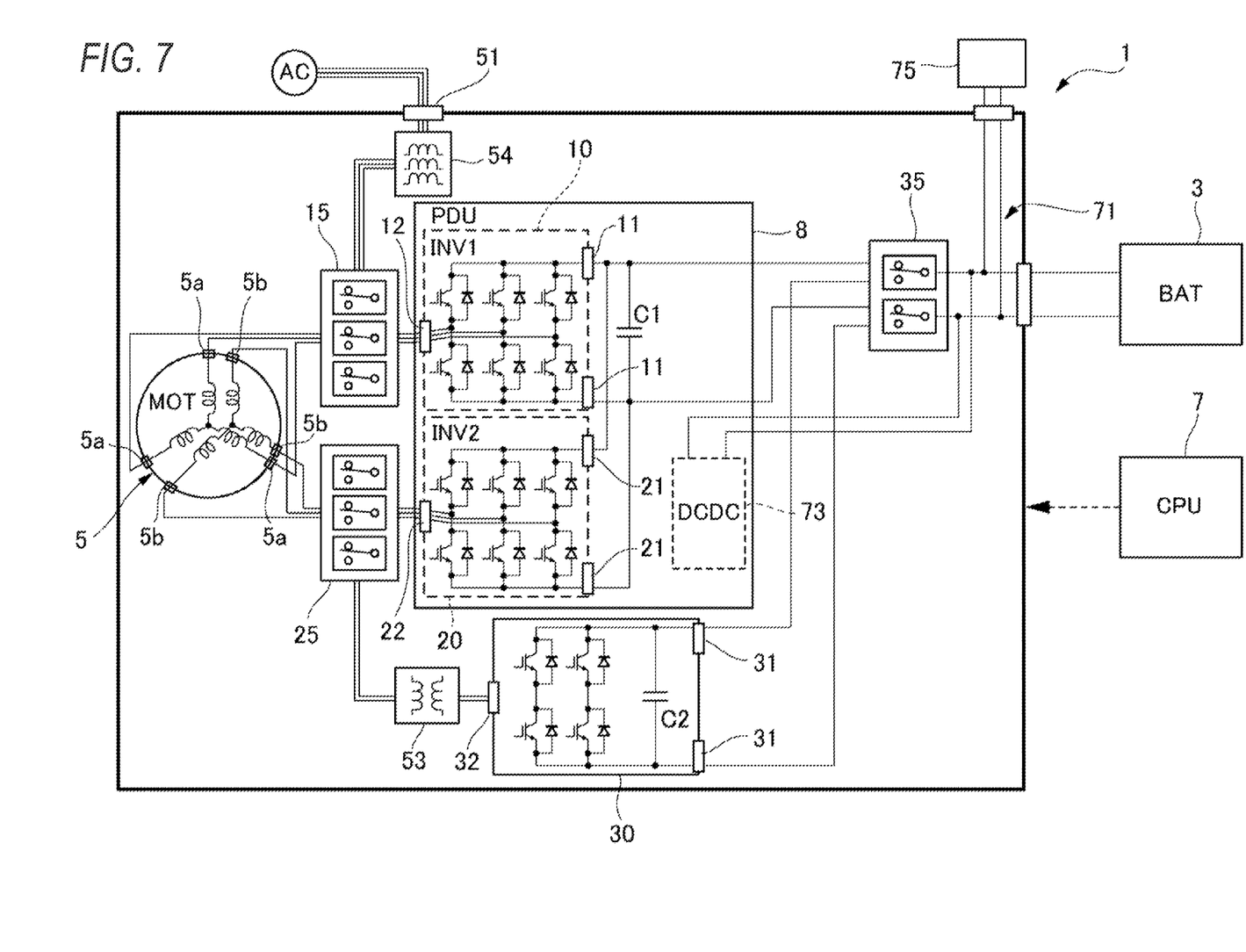
FIG. 7 is a circuit diagram of the motor driving apparatus 1 of a fifth embodiment.

FIG. 7 is a circuit diagram of the motor driving apparatus 1 of a fifth embodiment. The motor driving apparatus 1 of the present embodiment is a modification of the motor driving apparatus 1 of the fourth embodiment, and the accessory connection circuit 71 is connected between the power storage device 3 and the third switch 35, and transmits power to an accessory. According to this configuration, the accessory can be continuously used when switching between a driving mode and an external AC charging mode.

The motor driving apparatus 1 may be mounted on a vehicle provided with an occupant operation unit (a shift, a switch, a button, a touch panel, or the like) which switches a driving state according to an operation of an occupant. In this case, the motor 5 is a driving source of the vehicle, and the control device 7 switches the first switch 15, the second switch 25, and the third switch 35 in conjunction with the occupant operation unit. According to this configuration, the power supply to the motor 5 can be cut off in conjunction with the occupant operation unit, and thus the power supply to the motor 5 can be cut off at the time of parking.

The first switch 15 and the second switch 25 may include, for example, a C-contact switch. The C-contact switches are such that when one switch is in a connected state, the other switch is in a disconnected state, and when the one switch is in the disconnected state, the other switch is in the connected state. According to this configuration, since the switches are not physically connected at the same time, it is possible to prevent a charging current from flowing to the motor 5.

Figure 8:
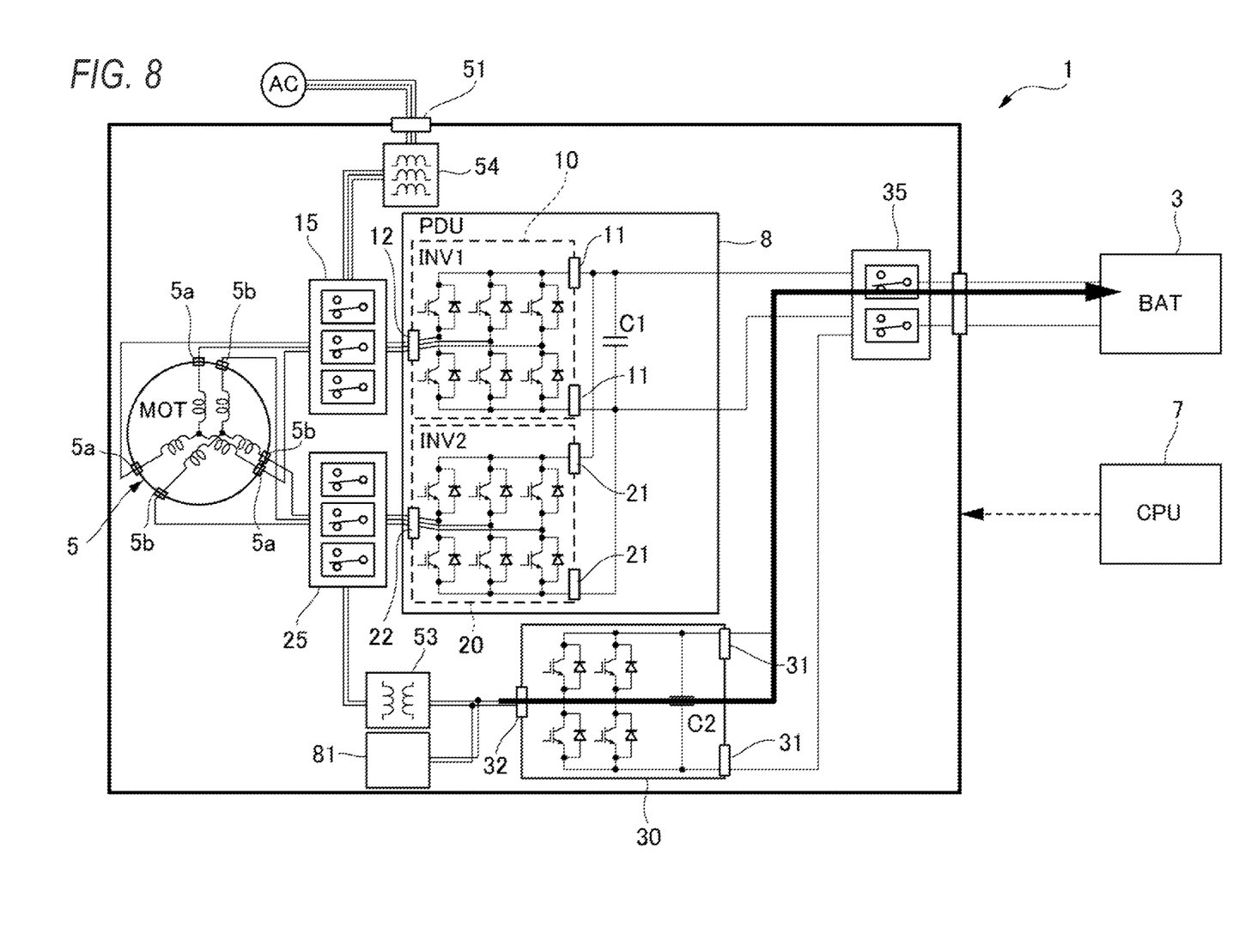
FIG. 8 is a circuit diagram of the motor driving apparatus 1 of a sixth embodiment and a diagram showing the current flow when a non-contact charging device is connected in the circuit diagram.

FIG. 8 is a circuit diagram of the motor driving apparatus 1 of a sixth embodiment and a diagram showing the current flow when a non-contact charging device 81 is connected in the circuit diagram. In addition to the configurations of the above embodiments, the motor driving apparatus 1 of the present embodiment further includes the non-contact charging device 81 connected to the AC terminal 32 of the third inverter 30 in parallel with the transformer 53. According to this configuration, the third inverter 30 can also serve as an inverter of the non-contact charging device 81, and an increase in costs due to the addition of a non-contact charging function can be prevented.

Although embodiments for carrying out the present disclosure have been described above using the embodiments, the present disclosure is by no means limited to these embodiments at all, and various modifications and substitutions can be made without departing from the gist of the present disclosure.

At least the following matters are described in the present specification. Corresponding components in the above embodiments are shown in parentheses, and the present disclosure is not limited thereto.

(1) A motor driving apparatus (motor driving apparatus 1) including:
- a power storage device (power storage device 3);
- a motor (motor 5) including at least a first winding connection portion (first winding connection portion 5*a*) and a second winding connection portion (second winding connection portion 5*b*)
- a first inverter (first inverter 10) including a DC terminal (DC terminal 11) and an AC terminal (AC terminal 12) and configured to supply power from the power storage device to the first winding connection portion;
- a second inverter (second inverter 20) including a DC terminal (DC terminal 21) and an AC terminal (AC terminal 22) and configured to supply power from the power storage device to the second winding connection portion;
- an external AC terminal (external AC terminal 51) capable of transmitting power between the power storage device and an external AC power supply;
- a third inverter (third inverter 30) including a DC terminal (DC terminal 31) and an AC terminal (AC terminal 32);
- a transformer (transformer 53) connected to the AC terminal of the third inverter;
- a first switch (first switch 15) capable of switching the AC terminal of the first inverter to a state of being connected to either the first winding connection portion or the external AC terminal;
- a second switch (second switch 25) capable of switching the AC terminal of the second inverter to a state of being connected to either the second winding connection portion or the transformer; and
- a third switch (third switch 35) capable of switching the power storage device to a state of being connected to either the DC terminal of the first inverter and the DC terminal of the second inverter or the DC terminal of the third inverter.

According to (1), since a driving circuit and a charging circuit can be shared, the number of electronic components used only for charging and the number of electronic components used only for driving are reduced, and the number of components can be reduced. Since both the first inverter and the second inverter are used during driving, a capacity can be halved as compared with the case of using one inverter. The first inverter and the second inverter can perform a plurality of functions (part of rectification and DC-DC conversion) of an insulated AC charger, and can optimize a driving circuit capacity for charging.

(2) The motor driving apparatus according to (1), further including:
a control device (control device 7) configured to control the first switch, the second switch, the third switch, the first invertor, the second invertor, and third inverter in which:
when driving the motor, the control device is configured to:
control the first switch such that the AC terminal of the first inverter is connected to the first winding connection portion;
control the second switch such that the AC terminal of the second inverter is connected to the second winding connection portion;
control the third switch such that the power storage device is connected to the DC terminal of the first inverter and the DC terminal of the second inverter; and
set a driving mode in which the motor is driven using the first inverter and the second inverter; and
when the external AC power supply is connected to the external AC terminal, the control device is configured to:
control the first switch such that the AC terminal of the first inverter is connected to the external AC terminal:
control the second switch such that the AC terminal of the second inverter is connected to the transformer;
control the third switch such that the power storage device is connected to the DC terminal of the third inverter; and
set an external AC charging mode in which power is transmitted between the power storage device and the external AC power supply AC using the first inverter, the second inverter, and the third inverter.

According to (2), the motor can be driven using the first inverter and the second inverter when driving the motor, and the power storage device can be charged using the first inverter, the second inverter, and the third inverter when the external AC power supply is connected.

(3) The motor driving apparatus according to (2), further including:
an external DC terminal (external DC terminal 61) connected between the DC terminal of the third inverter and the third switch, in which:
when an external DC power supply is connected to the external DC terminal, the control device is configured to:
control the second switch such that the AC terminal of the second inverter is connected to the transformer;
control the third switch such that the power storage device is connected to the DC terminal of the first inverter and the DC terminal of the second inverter: and
set a first external DC charging mode in which power is transmitted between the power storage device and the external DC power supply using the second inverter, the transformer, and the third inverter.

According to (3), when the external DC power supply is connected, the power storage device can be charged using the second inverter, the transformer, and the third inverter.

(4) The motor driving apparatus according to (2), further including:
an external DC terminal (external DC terminal 61) connected between the DC terminal of the third inverter and the third switch, in which:
when an external DC power supply is connected to the external DC terminal the control device is configured to:
control the third switch such that the power storage device is connected to the DC terminal of the third inverter, and
set a second external DC charging mode in which power is transmitted to the power storage device without using the third inverter.

According to (4), when the external DC power supply is connected, the power storage device can be charged without using the third inverter.

(5) The motor driving apparatus according to any one of (2) to (4), further including:
an accessory connection circuit (accessory connection circuit 71) connected between the first inverter and the third switch and between the second inverter and the third switch, and configured to transmit power to an accessory (DC-DC converter 73, electric oil pump 75), in which:
the control device is capable of controlling the accessory connection circuit; and
the control device stops an operation of the accessory connection circuit when switching between the driving mode and the external AC charging mode.

According to (5), it is possible to suppress an arc generated in the third switch when switching between the driving mode and the external AC charging mode, thereby extending the life of the third switch.

(6) The motor driving apparatus according to any one of (2) to (4), further including:
an accessory connection circuit (accessory connection circuit 71) connected between the power storage device and the third switch and configured to transmit power to an accessory (DC-DC converter 73, electric oil pump 75).

According to (6), the accessory can be continuously used when switching between the driving mode and the external AC charging mode.

(7) The motor driving apparatus according to any one of (2) to (6), in which:
the motor driving apparatus is mounted on a vehicle provided with an occupant operation unit which switches a driving state according to an operation of an occupant
the motor is a driving source of the vehicle, and
the control device switches the first switch, the second switch, and the third switch in conjunction with the occupant operation unit.

According to (7), the power supply to the motor can be cut off in conjunction with the occupant operation unit, and thus the power supply to the motor can be cut off at the time of parking.

(8) The motor driving apparatus according to (7), in which the first switch and the second switch include C-contact switches.

According to (8), since the switches are not physically connected at the same time, it is possible to prevent a charging current from flowing to the motor.

(9) The motor driving apparatus according to any one of (1) to (8), further including:

a non-contact charging device (non-contact charging device 81) connected between the transformer and the AC terminal of the third inverter.

According to (9), the third inverter can also serve as an inverter of the non-contact charging device, and an increase in costs due to the addition of a non-contact charging function is prevented.

What is claimed is:

1. A motor driving apparatus, comprising:
    a power storage device;
    a motor including at least a first winding connection portion and a second winding connection portion;
    a first inverter including a DC terminal and an AC terminal and configured to supply power from the power storage device to the first winding connection portion;
    a second inverter including a DC terminal and an AC terminal and configured to supply power from the power storage device to the second winding connection portion;
    an external AC terminal configured to transmit power between the power storage device and an external AC power supply;
    a third inverter including a DC terminal and an AC terminal;
    a transformer connected to the AC terminal of the third inverter;
    a first switch configured to switch the AC terminal of the first inverter to a state of being connected to either the first winding connection portion or the external AC terminal;
    a second switch configured to switch the AC terminal of the second inverter to a state of being connected to either the second winding connection portion or the transformer; and
    a third switch configured to switch the power storage device to a state of being connected to either the DC terminal of the first inverter and the DC terminal of the second inverter or the DC terminal of the third inverter.

2. The motor driving apparatus according to claim 1, further comprising:
    a control device configured to control the first switch, the second switch, the third switch, the first inverter, the second inverter, and the third inverter, wherein:
    when driving the motor, the control device is configured to:
        control the first switch such that the AC terminal of the first inverter is connected to the first winding connection portion;
        control the second switch such that the AC terminal of the second inverter is connected to the second winding connection portion;
        control the third switch such that the power storage device is connected to the DC terminal of the first inverter and the DC terminal of the second inverter; and
        set a driving mode in which the motor is driven using the first inverter and the second inverter; and
    when the external AC power supply is connected to the external AC terminal, the control device is configured to:
        control the first switch such that the AC terminal of the first inverter is connected to the external AC terminal;
        control the second switch such that the AC terminal of the second inverter is connected to the transformer;
        control the third switch such that the power storage device is connected to the DC terminal of the third inverter; and
        set an external AC charging mode in which power is transmitted between the power storage device and the external AC power supply AC using the first inverter, the second inverter, and the third inverter.

3. The motor driving apparatus according to claim 2, further comprising:
    an external DC terminal connected between the DC terminal of the third inverter and the third switch, wherein:
    when an external DC power supply is connected to the external DC terminal, the control device is configured to:
        control the second switch such that the AC terminal of the second inverter is connected to the transformer;
        control the third switch such that the power storage device is connected to the DC terminal of the first inverter and the DC terminal of the second inverter; and
        set a first external DC charging mode in which power is transmitted between the power storage device and the external DC power supply using the second inverter, the transformer, and the third inverter.

4. The motor driving apparatus according to claim 2, further comprising:
    an external DC terminal connected between the DC terminal of the third inverter and the third switch, wherein:
    when an external DC power supply is connected to the external DC terminal, the control device is configured to:
        control the third switch such that the power storage device is connected to the DC terminal of the third inverter; and
        set a second external DC charging mode in which power is transmitted to the power storage device without using the third inverter.

5. The motor driving apparatus according to claim 2, further comprising:
    an accessory connection circuit connected between the first inverter and the third switch and between the second inverter and the third switch, and configured to transmit power to an accessory, wherein:
    the control device is configured to control the accessory connection circuit; and
    the control device stops an operation of the accessory connection circuit when switching between the driving mode and the external AC charging mode.

6. The motor driving apparatus according to claim 2, further comprising:
    an accessory connection circuit connected between the power storage device and the third switch and configured to transmit power to an accessory.

7. The motor driving apparatus according to claim 2, wherein:
    the motor driving apparatus is mounted on a vehicle provided with an occupant operation unit which switches a driving state according to an operation of an occupant;
    the motor is a driving source of the vehicle; and
    the control device switches the first switch, the second switch, and the third switch in conjunction with the occupant operation unit.

8. The motor driving apparatus according to claim 7, wherein the first switch and the second switch comprise C-contact switches.

9. The motor driving apparatus according to claim 1, further comprising:
   a non-contact charging device connected between the transformer and the AC terminal of the third inverter.

* * * * *